(12) United States Patent
Matsumoto et al.

(10) Patent No.: US 11,827,799 B2
(45) Date of Patent: Nov. 28, 2023

(54) ULTRAVIOLET CURABLE SILICONE COMPOSITION AND CURED PRODUCT OF SAME

(71) Applicant: SHIN-ETSU CHEMICAL CO., LTD., Tokyo (JP)

(72) Inventors: Nobuaki Matsumoto, Annaka (JP); Taichi Kitagawa, Annaka (JP); Atsushi Yaginuma, Annaka (JP); Masaaki Shirota, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 17/566,260

(22) Filed: Dec. 30, 2021

(65) Prior Publication Data

US 2022/0119663 A1    Apr. 21, 2022

Related U.S. Application Data

(62) Division of application No. 16/311,209, filed as application No. PCT/JP2017/020183 on May 31, 2017, now abandoned.

(30) Foreign Application Priority Data

Jun. 30, 2016 (JP) .................. 2016-129555

(51) Int. Cl.
| | |
|---|---|
| C09D 11/38 | (2014.01) |
| B33Y 70/00 | (2020.01) |
| C08F 290/06 | (2006.01) |
| B41M 5/00 | (2006.01) |
| B29C 64/112 | (2017.01) |
| C09D 11/101 | (2014.01) |
| C09D 11/102 | (2014.01) |

(52) U.S. Cl.
CPC ............ C09D 11/38 (2013.01); B29C 64/112 (2017.08); B33Y 70/00 (2014.12); B41M 5/00 (2013.01); C08F 290/06 (2013.01); C09D 11/101 (2013.01); C09D 11/102 (2013.01)

(58) Field of Classification Search
CPC ..... C09D 11/38; C09D 11/101; C09D 11/102; C09D 11/30; B29C 64/112; B33Y 70/00; B33Y 80/00; B41M 5/00; C08F 290/06; C08F 283/124; C08F 2/48; C08F 290/148; C08G 77/20; C08G 77/442; C08L 83/10
See application file for complete search history.

(56) References Cited

U.S. PATENT DOCUMENTS

| | | | |
|---|---|---|---|
| 4,355,147 A | 10/1982 | Deichert et al. | |
| 2011/0196096 A1 | 8/2011 | Angermaier et al. | |
| 2012/0133060 A1 | 5/2012 | Nakane et al. | |
| 2013/0234370 A1 | 9/2013 | Suzuki et al. | |
| 2013/0307913 A1 | 11/2013 | Kawashima et al. | |
| 2014/0104356 A1* | 4/2014 | Kitade .................. | C09D 11/30 522/167 |
| 2015/0124032 A1* | 5/2015 | De Mondt ........... | B41M 5/0064 347/102 |
| 2016/0137839 A1* | 5/2016 | Rolland ............... | C08K 5/0041 522/71 |
| 2016/0263826 A1 | 9/2016 | Suzuki et al. | |
| 2016/0264796 A1 | 9/2016 | Suzuki et al. | |

FOREIGN PATENT DOCUMENTS

| | | | | |
|---|---|---|---|---|
| CN | 1371484 A | 9/2002 | | |
| EP | 1 229 376 A1 | 8/2002 | | |
| EP | 2818327 A1 * | 12/2014 | ............ | B41J 2/2107 |
| JP | 57-209914 A | 12/1982 | | |

(Continued)

OTHER PUBLICATIONS

Gelest, DMS-R31 Safety Data Sheet (No date).*

(Continued)

*Primary Examiner* — Jessica M Roswell
(74) *Attorney, Agent, or Firm* — Birch, Stewart, Kolasch & Birch, LLP

(57) ABSTRACT

Provided is an ultraviolet curable silicone composition capable of being ejected via inkjet ejection. The composition of the invention is an ultraviolet curable silicone composition comprising:

(A) an organopolysiloxane represented by the following general formula (1)

$$R^1-\underset{\underset{R^1}{|}}{\overset{\overset{R^1}{|}}{Si}}-O\left(\underset{\underset{R^1}{|}}{\overset{\overset{R^1}{|}}{Si}}-O\right)_n\underset{\underset{R^1}{|}}{\overset{\overset{R^1}{|}}{Si}}-R^1 \quad (1)$$

wherein each $R^1$ independently represents a group selected from a monovalent aliphatic hydrocarbon group having 1 to 10 carbon atoms, an acryloyl group, a methacryloyl group, an alkyl acrylate group and an alkyl methacrylate group, while the component (A) has per molecule at least two groups selected from an acryloyl group, a methacryloyl group, an alkyl acrylate group and an alkyl methacrylate group; n represents a number satisfying $10 \leq n \leq 1{,}000$;

(B) a monofunctional (meth)acrylate compound having no siloxane structure; and/or (C) a multifunctional (meth)acrylate compound having no siloxane structure; and (D) a photopolymerization initiator.

18 Claims, 1 Drawing Sheet

(56) References Cited

FOREIGN PATENT DOCUMENTS

| JP | 11-287971 A | 10/1999 |
|----|----|----|
| JP | 2012-111226 A | 6/2012 |
| JP | 2012-193230 A | 10/2012 |
| JP | 2012-193231 A | 10/2012 |
| JP | 5384656 B2 | 1/2014 |
| JP | 2014-210871 A | 11/2014 |
| JP | 5725401 B2 | 5/2015 |

OTHER PUBLICATIONS

Gelest, DMS-R18 Safety Data Sheet (No date).*
U.S. Appl. No. 16/311,209, filed Dec. 19, 2018.
Extended European Search Report dated Feb. 25, 2020, in European Patent Application No. 17819748.9.
International Search Report, issued in PCT/JP2017/020183, dated Aug. 8, 2017.
Korean Office Action for Application No. 10-2019-7002340 dated Nov. 10, 2020.
Office Action dated Jul. 3, 2020, in Chinese Patent Application No. 201780040100.9.
Office Action dated Sep. 3, 2019, in Japanese Patent Application No. 2018-524972.
Taiwanese Office Action for Appl. No. 106118784 dated Dec. 29, 2020 (w/ English translation).
Written Opinion of the International Searching Authority, issued in PCT/JP2017/020183, dated Aug. 8, 2017.
Yasuda et al., machine English translation of CN 1371484(A) (Year: 2002).

* cited by examiner

ULTRAVIOLET CURABLE SILICONE COMPOSITION AND CURED PRODUCT OF SAME

CROSS-REFERENCE TO RELATED APPLICATIONS

This application is a Divisional of copending application Ser. No. 16/311,209, filed on Dec. 19, 2018, which is the National Phase under 35 U.S.C. § 371 of International Application No. PCT/JP2017/020183, filed on May 31, 2017, which claims the benefit under 35 U.S.C. § 119(a) to Patent Application No. 2016-129555, filed in Japan on Jun. 30, 2016, all of which are hereby expressly incorporated by reference into the present application.

TECHNICAL FIELD

The present invention relates to an ultraviolet curable silicone composition capable of being ejected via inkjet ejection; and a cured product thereof.

BACKGROUND ART

Ultraviolet curable ink-jet inks in the field of industrial inkjet printer are about to become mainstream, due to the fact that they are quick-drying and low-volatile, and can even be printed on a non-absorbable material. Although there are examples (Patent documents 1, 2 and 3) where silicone is contained by a small amount in such ultraviolet curable ink-jet ink, as a defoaming agent, a surfactant and/or a wear resistance improving agent, there has never been an example where silicone is used as a main component in such ink-jet ink. This is mainly because silicone has a significantly low surface tension; and if contained in the ink by a large amount, the ink cannot be ejected via inkjet ejection. However, if silicone can be used as a main component, not only a favorable rubber property can be imparted, but the weather resistance of the ink itself can be improved as well, which broadens the range of the industrial purposes of silicone.

For example, in recent years, although materials for use in an ink-jet 3D printer are being actively developed, these materials are often resins that are extremely hard (Patent document 4). While there has already been proposed a silicone material for use in a 3D printer (Patent document 5), there has never been a silicone material capable of being ejected via inkjet ejection. Thus, strongly desired is the development of a material capable of being ejected via inkjet ejection and exhibiting favorable rubber properties after curing.

PRIOR ART DOCUMENT

Patent Document

Patent document 1: Japanese Patent No. 5725401
Patent document 2: JP-A-2012-193230
Patent document 3: JP-A-2012-193231
Patent document 4: JP-A-2012-111226
Patent document 5: Japanese Patent No. 5384656.

SUMMARY OF THE INVENTION

Problem to be Solved by the Invention

Therefore, it is an object of the present invention to provide an ultraviolet curable silicone composition capable of being ejected via inkjet ejection, and forming a cured product having favorable rubber properties.

Means to Solve the Problem

A series of studies was diligently conducted to achieve the above objectives, and the invention was completed as follows. That is, there were developed an ultraviolet curable silicone composition capable of being ejected via inkjet ejection and a cured product thereof, by employing a particular ultraviolet curable organopolysiloxane component; and a monofunctional ethylene group-containing compound having no siloxane structure and/or a multifunctional ethylene group-containing compound having no siloxane structure.

The present invention is to provide the following ultraviolet curable silicone composition.

[1]
An ultraviolet curable silicone composition containing:
(A) 100 parts by mass of an organopolysiloxane represented by the following general formula (1)

[Chemical formula 1]

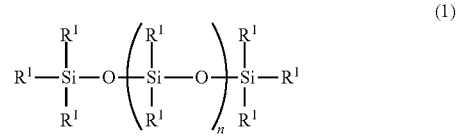

wherein each $R^1$ independently represents a group selected from a monovalent aliphatic hydrocarbon group having 1 to 10 carbon atoms, an acryloyl group, a methacryloyl group, an alkyl acrylate group and an alkyl methacrylate group, while the component (A) has per molecule at least two groups selected from an acryloyl group, a methacryloyl group, an alkyl acrylate group and an alkyl methacrylate group; n represents a number satisfying $10 \leq n \leq 1{,}000$;
(B) a monofunctional (meth)acrylate compound having no siloxane structure; and/or (C) a multifunctional (meth)acrylate compound having no siloxane structure, the component (B) and/or the component (C) being in an amount of 1 to 500 parts by mass per 100 parts by mass of the component (A); and
(D) a photopolymerization initiator in an amount of 0.1 to 20 parts by mass per 100 parts by mass of the component (A).

[2]
The ultraviolet curable silicone composition according to [1], further comprising:
(E) an organopolysiloxane being in an amount of 0.1 to 1,000 parts by mass per 100 parts by mass of the component (A), and represented by the following general formula (2)

[Chemical formula 2]

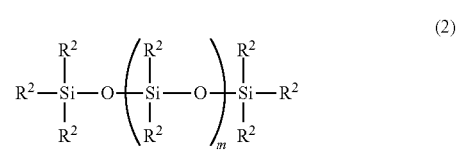

wherein each $R^2$ independently represents a group selected from a monovalent aliphatic hydrocarbon group having 1 to 10 carbon atoms, an acryloyl group, a methacryloyl group, an alkyl acrylate group and an alkyl methacrylate group, while the component (E) has per molecule one group selected from an acryloyl group, a methacryloyl group, an alkyl acrylate group and an alkyl methacrylate group; m represents a number satisfying 10≤m≤1,000.

[3]

The ultraviolet curable silicone composition according to [1] or [2], wherein the composition has a viscosity of not higher than 2,000 mPa·s at 23° C., and has a surface tension of not smaller than 21 mN/m.

[4]

A cured product of the ultraviolet curable silicone composition as set forth in any one of [1] to [3].

[5]

An ink-jet ink composition containing the ultraviolet curable silicone composition as set forth in any one of [1] to [3].

[6]

An ink composition for 3D printer, containing the ultraviolet curable silicone composition as set forth in any one of [1] to [3].

Effects of the Invention

The ultraviolet curable silicone composition of the present invention has a favorable viscosity, surface tension and curability, and can be ejected via inkjet ejection. Further, the cured product of this composition has favorable rubber properties (hardness, tensile strength and elongation at break). In this way, the ultraviolet curable silicone composition of the invention is useful as an ink-jet ink material, particularly as a silicone material for use in an ink-jet 3D printer.

MODE FOR CARRYING OUT THE INVENTION

Figure 1:
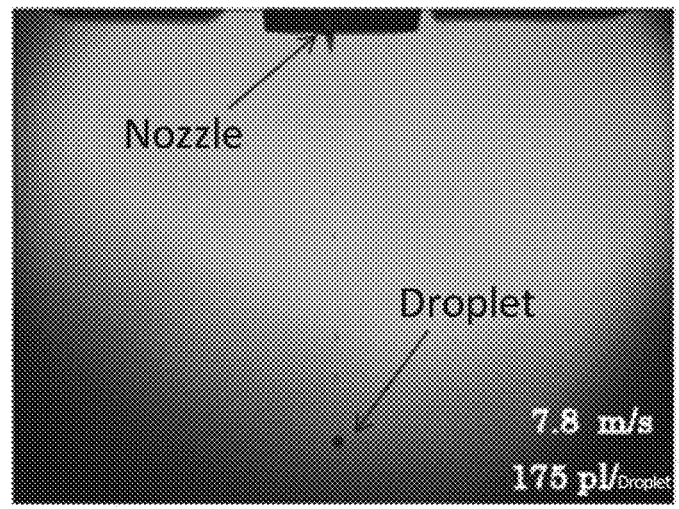
FIG. 1 is a picture showing how a composition prepared in a working example 1 is ejected via inkjet ejection.

The present invention is described in greater detail hereunder.

(A) Organopolysiloxane

A component (A) is an organopolysiloxane represented by the following general formula (1).

[Chemical formula 3]

$$R^1-\underset{\underset{R^1}{|}}{\overset{\overset{R^1}{|}}{Si}}-O-\left(\underset{\underset{R^1}{|}}{\overset{\overset{R^1}{|}}{Si}}-O\right)_n\underset{\underset{R^1}{|}}{\overset{\overset{R^1}{|}}{Si}}-R^1 \quad (1)$$

In the above formula (1), each $R^1$ independently represents a group selected from a monovalent aliphatic hydrocarbon group having 1 to 10 carbon atoms, an acryloyl group, a methacryloyl group, an alkyl acrylate group, and an alkyl methacrylate group. A monovalent aliphatic hydrocarbon group having 1 to 8 carbon atoms is preferred as such monovalent aliphatic hydrocarbon group, examples of which include alkyl groups such as a methyl group, an ethyl group, a propyl group, a butyl group, a pentyl group, a hexyl group and an octyl group. More preferred is a monovalent aliphatic hydrocarbon group having 1 to 6 carbon atoms; particularly, it is preferred, in terms of ease of synthesis and cost, that 80% or more of all the $R^1$s be methyl groups.

Further, at least two of the $R^1$s in the above formula (1) are selected from an acryloyl group, a methacryloyl group, an alkyl acrylate group and an alkyl methacrylate group. Examples of such alkyl acrylate groups include an acrylic acid butyl group and an acrylic acid propyl group; and examples of such alkyl methacrylate groups include a methacrylic acid butyl group and a methacrylic acid propyl group. In the compound represented by the above formula (1), it is preferred that the at least two $R^1$s be selected from a methacrylic acid propyl group or an acrylic acid propyl group, and they may be either identical to or different from each other.

In the formula (1), "n" represents a number satisfying 10≤n≤1,000, preferably 20≤n≤500, more preferably 30≤n≤300. When n is smaller than 10, the composition will easily volatilize; when n is larger than 1,000, the viscosity of the composition will increase such that inkjet ejection will be difficult. The value of n can be calculated as an average value via $^{29}$Si-NMR measurement.

It is preferred, in terms of ease of synthesis and cost, that the organopolysiloxane represented by the formula (1) be that having a methacrylic acid propyl group or acrylic acid propyl group at each of the two ends of the molecule.

Examples of such organopolysiloxane include the following compounds.

[Chemical formulae 4]

$$\text{(3)}$$

$$\underset{}{\overset{O}{\underset{}{\parallel}}}-O-(CH_2)_k-\underset{\underset{R_1}{|}}{\overset{\overset{R_1}{|}}{Si}}-O-\left(\underset{\underset{R_1}{|}}{\overset{\overset{R_1}{|}}{Si}}-O\right)_n\underset{\underset{R_1}{|}}{\overset{\overset{R_1}{|}}{Si}}-(CH_2)_k-O-\underset{}{\overset{O}{\underset{}{\parallel}}}$$

$$\text{(4)}$$

$$\underset{}{\overset{O}{\underset{}{\parallel}}}-O-(CH_2)_k-\underset{\underset{R_1}{|}}{\overset{\overset{R_1}{|}}{Si}}-O-\left(\underset{\underset{R_1}{|}}{\overset{\overset{R_1}{|}}{Si}}-O\right)_n\underset{\underset{R_1}{|}}{\overset{\overset{R_1}{|}}{Si}}-(CH_2)_k-O-\underset{}{\overset{O}{\underset{}{\parallel}}}$$

In the above formulae (3) and (4), each IV independently represents a monovalent aliphatic hydrocarbon group having 1 to 10 carbon atoms, specific examples of which include groups similar to those listed as the examples of IV in the general formula (1). "n" represents a number satisfying 10≤n≤1,000; "k" represents a number satisfying 0≤k≤4.

It is preferred that the organopolysiloxane as the component (A) be contained in the composition by an amount of 10 to 95% by mass, more preferably 15 to 80% by mass.

(B) Monofunctional (Meth)Acrylate Compound Having No Siloxane Structure

A component (B) is a monofunctional (meth)acrylate compound having no siloxane structure. Examples of such monofunctional (meth)acrylate compound having no siloxane structure, include isoamylacrylate, lauryl acrylate, stearyl acrylate, ethoxy-diethylene glycol acrylate, methoxy-triethylene glycol acrylate, 2-ethylhexyl-diglycol acrylate, phenoxy ethyl acrylate, phenoxydiethylene glycol acrylate, tetrahydrofurfuryl acrylate, isobornyl acrylate, and mixtures thereof, among which isobornyl acrylate is preferred.

(C) Multifunctional (Meth)Acrylate Compound Having No Siloxane Structure

A component (C) is a multifunctional (meth)acrylate compound having no siloxane structure. Examples of such multifunctional (meth)acrylate compound having no siloxane structure, include triethylene glycol diacrylate, polytetramethylene glycol diacrylate, neopentyl glycol diacrylate, 1,6-hexanediol diacrylate, dimethylol-tricyclodecane diacrylate, trimethylolpropane triacrylate, pentaerythritol tetraacrylate, and mixtures thereof, among which dimethylol-tricyclodecane diacrylate is preferred.

Any one or both of the (meth)acrylate compounds as the components (B) and (C) is/are added in a total amount of 1 to 500 parts by mass, preferably 10 to 400 parts by mass, per 100 parts by mass of the component (A). When the total amount of the components (B) and/or (C) added is smaller than 1 part by mass per 100 parts by mass of the component (A), the composition will exhibit an insufficient curability, and inkjet ejection will be difficult as the surface tension weakens. When combined with the high-viscosity component (A), the viscosity of the composition as a whole can be adjusted to a desired range suitable for performing inkjet ejection, by increasing the total amount of the components (B) and/or (C) added. However, if such total amount is greater than 500 parts by mass per 100 parts by mass of the component (A), the cured product will exhibit a hardness higher than necessary in a way such that a desired rubber property cannot be achieved.

(D) Photopolymerization Initiator

A component (D) is a photopolymerization initiator. Examples of such photopolymerization initiator include 2,2-diethoxyacetophenone, 2,2-dimethoxy-1,2-diphenylethane-1-one (Irgacure 651 by BASF), 1-hydroxy-cyclohexyl-phenyl-ketone (Irgacure 184 by BASF), 2-hydroxy-2-methyl-1-phenyl-propane-1-one (Irgacure 1173 by BASF), 2-hydroxy-1-{4-[4-(2-hydroxy-2-methyl-propionyl)-benzyl]-phenyl}-2-methyl-propane-1-one (Irgacure 127 by BASF), phenylglyoxylic acid methyl ester (Irgacure MBF by BASF), 2-methyl-1-[4-(methylthio)phenyl]-2-morpholinopropane-1-one (Irgacure 907 by BASF), 2-benzyl-2-dimethylamino-1-(4-morpholinophenyl)-1-butanone (Irgacure 369 by BASF), bis(2,4,6-trimethylbenzoyl)-phenylphosphine oxide (Irgacure 819 by BASF), 2,4,6-trimethylbenzoyl-diphenyl-phosphine oxide (Irgacure TPO by BASF), and mixtures thereof.

Among the above components (D), 2,2-diethoxyacetophenone, 2-hydroxy-2-methyl-1-phenyl-propane-1-one (Irgacure 1173 by BASF), bis(2,4,6-trimethylbenzoyl)-phenylphosphine oxide (Irgacure 819 by BASF) and 2,4,6-trimethylbenzoyl-diphenyl-phosphine oxide (Irgacure TPO by BASF) are preferred in terms of compatibility with the component (A).

The photopolymerization initiator is added in an amount of 0.1 to 20 parts by mass per 100 parts by mass of the component (A). If such amount added is smaller than 0.1 parts by mass per 100 parts by mass of the component (A), the composition will exhibit an insufficient curability; if such amount added is greater than 20 parts by mass per 100 parts by mass of the component (A), a depth-curability of the composition will be impaired.

(E) Organopolysiloxane

Other than the above essential components, the ultraviolet curable silicone composition of the present invention may further contain, as a component (E), an organopolysiloxane represented by the following general formula (2), if necessary.

[Chemical formula 5]

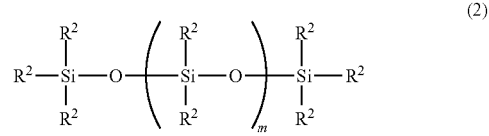

Each $R^2$ in the above formula (2) independently represents a group selected from a monovalent aliphatic hydrocarbon group having 1 to 10 carbon atoms, an acryloyl group, a methacryloyl group, an alkyl acrylate group and an alkyl methacrylate group. As such monovalent aliphatic hydrocarbon group, a monovalent aliphatic hydrocarbon group having 1 to 8 carbon atoms is preferred, examples of which include alkyl groups such as a methyl group, an ethyl group, a propyl group, a butyl group, a pentyl group, a hexyl group and an octyl group. More preferred is a monovalent aliphatic hydrocarbon group having 1 to 6 carbon atoms; particularly, it is preferred, in terms of ease of synthesis and cost, that 80% or more of all the $R^2$s be methyl groups.

Further, one of the $R^2$s in the above formula (2) is an acryloyl group, a methacryloyl group, an alkyl acrylate group or an alkyl methacrylate group. Examples of such alkyl acrylate group include an acrylic acid butyl group and an acrylic acid propyl group; examples of such alkyl methacrylate group include a methacrylic acid butyl group and a methacrylic acid propyl group. In the compound represented by the formula (2), it is preferred that the aforementioned one $R^2$ be a methacrylic acid propyl group or an acrylic acid propyl group in terms of ease of synthesis.

In the formula (2), "m" represents a number satisfying $10 \leq m \leq 1,000$, preferably $20 \leq m \leq 500$, more preferably $30 \leq m \leq 300$. When m is smaller than 10, the composition will easily volatilize; when m is larger than 1,000, the viscosity of the composition will increase such that inkjet ejection will be difficult. The value of m can be calculated as an average value via $^{29}$Si-NMR measurement.

It is preferred, in terms of ease of synthesis and cost, that the organopolysiloxane represented by the formula (2) be that having a methacrylic acid propyl group or acrylic acid propyl group at one end of the molecule.

Specific examples of such organopolysiloxane include the following compounds.

[Chemical formulae 6]

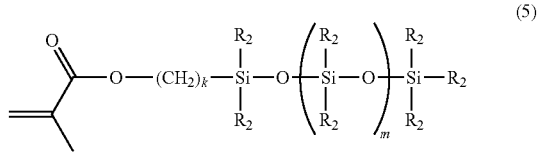

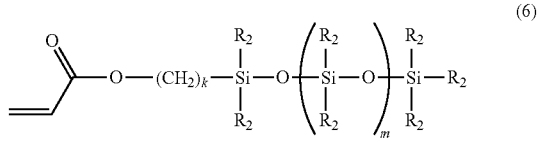

In the above formulae (5) and (6), each $R^2$ independently represents a monovalent aliphatic hydrocarbon group having 1 to 10 carbon atoms, specific examples of which include groups similar to those listed as the examples of $R^2$ in the above general formula (2). "m" represents a number satisfying $10 \leq m \leq 1,000$; "k" represents a number satisfying $0 \leq k \leq 4$.

If employing the component (E), it is preferred that the component (E) be added in an amount of 0.1 to 1,000 parts by mass, more preferably 1 to 100 parts by mass, per 100 parts by mass of the component (A). If the component (E) is added in an amount of 0.1 to 1,000 parts by mass per 100 parts by mass of the component (A), the cured product of the composition is expected to exhibit an improved elongation at break.

Other Components

Additives such as a color material (pigment or dye), a silane coupling agent, an adhesion aid, a polymerization inhibitor, an antioxidant, an ultraviolet absorber and a light stabilizer can be added to the composition of the invention without impairing the effects of the invention. Further, the composition of the invention may also be appropriately mixed with an other resin composition(s) before use.

Method for Producing Ultraviolet Curable Silicone Composition

The ultraviolet curable silicone composition of the invention can be produced by, for example, stirring and mixing the components (A), (B), (C) and (D); as well as the component (E) and other components, if necessary. Although there are no particular restrictions on a device used to perform stirring or the like, there may be used, for example, a kneader, triple roll mill, a ball mill and a planetary mixer. Further, these devices may also be appropriately used in combination.

It is preferred that the viscosity of the ultraviolet curable silicone composition of the invention at 23° C. be not higher than 2,000 mPa·s, more preferably not higher than 1,000 mPa·s. Further, it is preferred that the surface tension of the composition be not smaller than 21 mN/m, and not larger than 36 mN/m. If the viscosity and surface tension of the composition are within these ranges, inkjet ejection can be performed in a stable manner.

The ultraviolet curable silicone composition of the invention can be rapidly cured when irradiated by an ultraviolet light. Examples of a light source of the ultraviolet light with which the ultraviolet curable silicone composition of the invention is irradiated, include a UVLED lamp, a high-pressure mercury lamp, a super-high pressure mercury lamp, a metal halide lamp, a carbon-arc lamp and a xenon lamp. It is preferred that the irradiance level (cumulative light intensity) of the ultraviolet light be 1 to 5,000 mJ/cm$^2$, more preferably 10 to 4,000 mJ/cm$^2$, with respect to a sheet formed of the composition of the invention and having a thickness of about 2.0 mm. That is, when using an ultraviolet light of an intensity of 100 mW/cm$^2$, an ultraviolet irradiation for about 0.01 to 50 seconds will suffice.

Further, in order for the cured product of the ultraviolet curable silicone composition of the invention to exhibit excellent rubber properties, it is preferred that a hardness measured after curing be not lower than 10 (Type A), more preferably not lower than 20 (Type A). A tensile strength is preferably not lower than 0.5 MPa, more preferably not lower than 0.8 MPa. An elongation at break is preferably not lower than 10%, more preferably not lower than 20%. Here, these values were measured in accordance with JIS-K6249.

The hardness after curing can be adjusted by increasing or reducing the amount of any one or both of the components (B) and (C) added. The tensile strength and elongation at break after curing can be adjusted in a similar manner.

Working Example

The present invention is described in detail hereunder with reference to working and comparative examples. However, the invention is not limited to the following working examples.

Compositions in working examples 1 to 6; and comparative examples 1 and 2 were prepared at the composition ratios shown in Table 1, and then evaluated by the following methods.

In the following examples, a viscosity of the composition refers to a value measured by a rotary viscometer at 23° C. A surface tension refers to a value measured by a CBVP-Z type automatic surface tensiometer manufactured by Kyowa Interface Science Co., Ltd. Further, an inkjet ejection property was evaluated as follows. Specifically, there was used a droplet observation device IJK-2005 (glass-made 1-nozzle inkjet head IJHE-1000) manufactured by MICROJET Corporation, and an ejection status was shot with camera for evaluation under ejection conditions of: drive voltage 80V; head temperature 80° C.; and nozzle diameter 80 μm. There, "◯" was given when a droplet of 100 pl/droplet or more had been ejected; whereas "×" was given when such status was not met.

Figure 2:
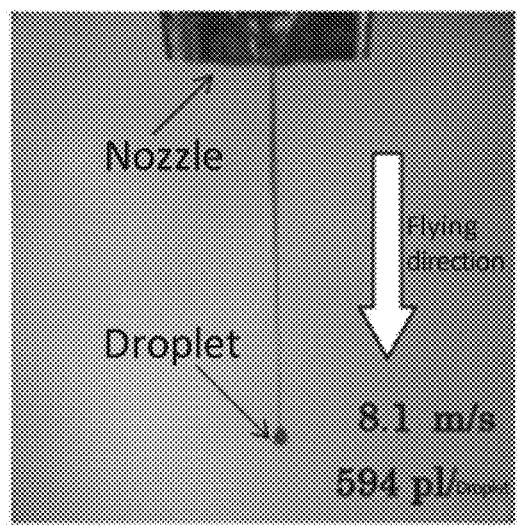
FIG. 2 is a picture showing how a composition prepared in a working example 4 is ejected via inkjet ejection.

FIGS. 1 and 2 show how inkjet ejection takes place with regard to the compositions prepared in the working examples 1 and 4.

A hardness, elongation at break and tensile strength of the cued product was measured in accordance with JIS-K6249. Here, the cured product was obtained by performing an ultraviolet irradiation of an intensity of 4,000 mJ/cm$^2$ under a nitrogen atmosphere, using a lamp H (M) 06-L-61 manufactured by EYE GRAPHICS Co., Ltd. Further, the sheet of the cured product was formed to a thickness of 2.0 mm.

Following are the components used in the working examples 1 to 6; and the comparative examples 1 and 2.

Component (A)

Synthesis Example 1

Put into a glass-made reactor equipped with a thermometer and a stirrer were 42 g of 1,3-bis(methacryloxypropyl) tetramethyldisiloxane, 806 g of octamethylcyclotetrasiloxane and 1.3 g of trifluoromethanesulfonic acid, followed by reacting them at 60° C. for five hours. Later, the temperature was reduced to 25° C., and 4 g of hydrotalcite (KYOWAAD 500 by Kyowa Chemical Industry Co., Ltd.) was added to perform neutralization. After filtration was completed, vacuum concentration was carried out at 120° C. to obtain 700 g of an organopolysiloxane A-1. The structure of A-1 (number of repeating units of dimethylsiloxy groups) was calculated via $^{29}$Si-NMR.

[Chemical formula 7]

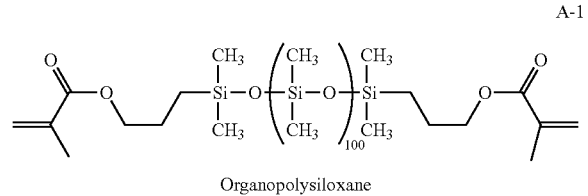

A-1

Organopolysiloxane

Synthesis Example 2

Put into a glass-made reactor equipped with a thermometer and a stirrer were 22 g of 1,3-bis(methacryloxypropyl)tetramethyldisiloxane, 248 g of octamethylcyclotetrasiloxane and 0.2 g of trifluoromethanesulfonic acid, followed by reacting them at 60° C. for five hours. Later, the temperature was reduced to 25° C., and 4 g of hydrotalcite (KYOWAAD 500 by Kyowa Chemical Industry Co., Ltd.) was added to perform neutralization. After filtration was completed, vacuum concentration was carried out at 120° C. to obtain 200 g of an organopolysiloxane A-2. The structure of A-2 (number of repeating units of dimethylsiloxy groups) was calculated via $^{29}$Si-NMR.

[Chemical formula 8]

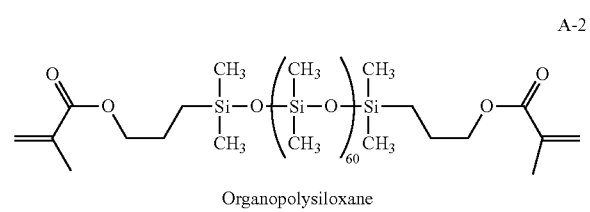

Organopolysiloxane

Synthesis Example 3

Put into a glass-made reactor equipped with a thermometer and a stirrer were 77 g of 1,3-bis(methacryloxypropyl)tetramethyldisiloxane, 366 g of tetramethylcyclotetrasiloxane, 1,050 g of octamethylcyclotetrasiloxane and 3.2 g of trifluoromethanesulfonic acid, followed by reacting them at 25° C. for 15 hours. Later, 19 g of hydrotalcite (KYOWAAD 500 by Kyowa Chemical Industry Co., Ltd.) was added to perform neutralization. After filtration was completed, vacuum concentration was carried out at 120° C. to obtain an organohydrogenpolysiloxane. Next, 836 g of hexane and 0.2 g of Karstedt's catalyst were added to such organohydrogenpolysiloxane, followed by reacting them at 120° C. for four hours, and then again carrying out vacuum concentration at 120° C. to obtain 1,627 g of an organopolysiloxane A-3. The structure of A-3 (number of repeating units of dimethylsiloxy groups) was calculated via $^{29}$Si-NMR.

[Chemical formula 9]

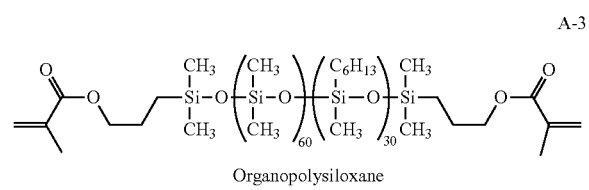

Organopolysiloxane

Synthesis Example 4

Put into a glass-made reactor equipped with a thermometer and a stirrer were 22 g of 1,3-bis(methacryloxypropyl)tetramethyldisiloxane, 4,150 g of octamethylcyclotetrasilane and 0.2 g of trifluoromethanesulfonic acid, followed by reacting them at 60° C. for five hours. Later, the temperature was reduced to 25° C., and 4 g of hydrotalcite (KYOWAAD 500 by Kyowa Chemical Industry Co., Ltd.) was added to perform neutralization. After filtration was completed, vacuum concentration was carried out at 120° C. to obtain 3,200 g of an organopolysiloxane A-4. The structure of A-4 (number of repeating units of dimethylsiloxy groups) was calculated via $^{29}$Si-NMR.

[Chemical formula 10]

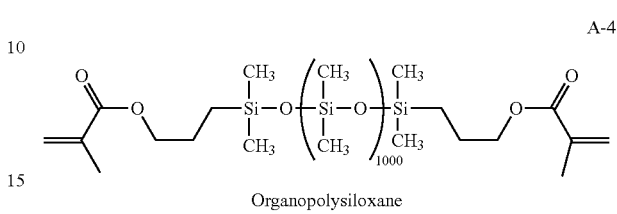

Organopolysiloxane

Component (B)
  Isobornyl acrylate (LIGHT ACRYLATE IB-XA by Kyoeisha Chemical Co., Ltd.)
Component (C)
  Dimethylol-tricyclodecane diacrylate (LIGHT ACRYLATE DCP-A by Kyoeisha Chemical Co., Ltd.)
Component (D)
  D-1: 2-hydroxy-2-methyl-1-phenyl-propane-1-one (Irgacure 1173 by BASF)
  D-2: 2,4,6-trimethylbenzoyl-diphenyl-phosphine oxide (Irgacure TPO by BASF)
Component (E):

Synthesis Example 5

Hexamethylcyclotrisiloxane of 100 g and toluene of 100 g were mixed together in a glass-made reactor equipped with a cooling tube, a thermometer, a dropping funnel and a stirrer, followed by performing azeotropic dehydration for an hour. Later, the reaction solution was cooled to 10° C., followed by delivering thereinto by drops 8.2 g of n-butyllithium (15% by mass hexane solution), and then raising the temperature to 25° C. to perform stirring for an hour. Next, 2 g of dimethylformamide was added to perform a polymerization reaction at 25° C. for 20 hours, followed by adding thereto 0.2 g of triethylamine, and then 4.6 g of 3-methacryloxypropyldimethylchlorosilane to react the mixture for another hour. Methanol of 100 g was further added thereto, and stirring was then performed for an hour before leaving the stirred product to stand still, thereby obtaining a siloxane layer. Next, vacuum concentration was carried out at 100° C. to obtain 70 g of the following component (E). The structure of such component (E) (number of repeating units of dimethylsiloxy groups) was calculated via $^{29}$Si-NMR.

[Chemical formula 11]

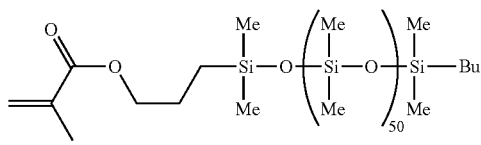

Other Organopolysiloxanes

Comparative Synthesis Example 1

The following organopolysiloxane A-5 was obtained in a similar manner as the synthesis example 4, except that the amount of octamethylcyclotetrasiloxane used was 8,300 g. The structure of A-5 (number of repeating units of dimethylsiloxy groups) was calculated via $^{29}$Si-NMR.

[Chemical formula 12]

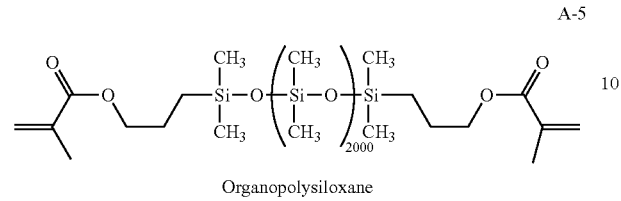

A-5

Organopolysiloxane

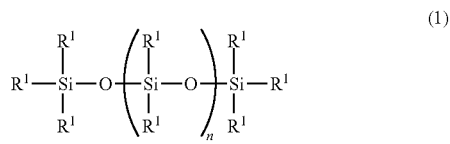

(1)

wherein each $R^1$ independently represents a group selected from a monovalent aliphatic hydrocarbon group having 1 to 10 carbon atoms, an acryloyl group, a methacryloyl group, an alkyl acrylate group and an alkyl methacrylate group, wherein the component (A) has per molecule at least two groups selected from an acryloyl group, a methacryloyl

TABLE 1

| | | Working example | | | | | | Comparative example | |
|---|---|---|---|---|---|---|---|---|---|
| | | 1 | 2 | 3 | 4 | 5 | 6 | 1 | 2 |
| Composition ratio (part by mass) | A-1 | 100 | 0 | 0 | 100 | 0 | 0 | 0 | 100 |
| | A-2 | 0 | 100 | 100 | 0 | 0 | 0 | 0 | 0 |
| | A-3 | 0 | 0 | 0 | 0 | 0 | 100 | 0 | 0 |
| | A-4 | 0 | 0 | 0 | 0 | 100 | 0 | 0 | 0 |
| | A-5 | 0 | 0 | 0 | 0 | 0 | 0 | 100 | 0 |
| | B | 45 | 45 | 45 | 75 | 500 | 70 | 20 | 0 |
| | C | 0 | 0 | 2 | 0 | 0 | 0 | 0 | 0 |
| | D-1 | 1.5 | 1.5 | 1.5 | 4.0 | 1.5 | 17 | 1.5 | 1.5 |
| | D-2 | 1.5 | 1.5 | 1.5 | 4.0 | 1.5 | 0 | 1.5 | 0 |
| | E | 0 | 0 | 0 | 75 | 0 | 0 | 0 | 0 |
| Property of composition | Viscosity (mPa·s) | 80 | 41 | 43 | 60 | 100 | 110 | 750,000 | 200 |
| | Surface tension (mN/m) | 22 | 22 | 22 | 23 | 22 | 25 | 21 | 20 |
| | Inkjet property | ○ | ○ | ○ | ○ | ○ | ○ | X | X |
| Property of cured product | Hardness (Type A) | 35 | 36 | 41 | 25 | 90 | 20 | 5 | Uncured |
| | Tensile strength (MPa) | 1.0 | 0.9 | 1.2 | 1.2 | 10.5 | 0.6 | 0.1 | Uncured |
| | Elongation at break (%) | 150 | 120 | 100 | 170 | 20 | 160 | 200 | Uncured |

The ultraviolet curable silicone composition of the present invention has a favorable inkjet ejection property and curability, and exhibits superior rubber properties after curing. Thus, the composition of the invention is useful as an ink-jet ink material, particularly as a silicone material for use in an ink-jet 3D printer. In contrast, in the comparative example 1 where an organopolysiloxane component outside the ranges shown in the formula (1) was used, inkjet ejection was not possible due to an increased viscosity; in the comparative example 2 where the component (B) was not used, the inkjet property deteriorated due to an insufficient surface tension, and an insufficient curability was observed.

The invention claimed is:

1. A method for ink-jet printing using an ink-jet 3D printer to produce a three-dimensional object of stereolithography, comprising:
   ejecting an ultraviolet curable silicone composition via ink-jet ejection using the ink-jet 3D printer;
   wherein the ultraviolet curable silicone composition comprises:
   (A) 100 parts by mass of an organopolysiloxane represented by the following general formula (1)

group, an alkyl acrylate group and an alkyl methacrylate group; and wherein n represents a number satisfying 10≤n≤1,000;

(B) a monofunctional (meth)acrylate compound having no siloxane structure, (C) a multifunctional (meth)acrylate compound having no siloxane structure, the component (B) and the component (C) being in a total amount of 1 to 500 parts by mass per 100 parts by mass of the component (A), and (D) a photopolymerization initiator in an amount of 0.1 to 20 parts by mass per 100 parts by mass of the component (A), and wherein the organopolysiloxane as the component (A) is contained in the composition in an amount of 15 to 80% by mass.

2. The method according to claim 1, wherein in the general formula (1), n represents a number satisfying 60≤n≤1,000.

3. The method according to claim 1, wherein in the general formula (1), n represents a number satisfying 20≤n≤500.

4. The method according to claim 1, wherein in the general formula (1), when $R^1$ is a monovalent aliphatic hydrocarbon group, it is independently a monovalent aliphatic hydrocarbon group having 1 to 8 carbon atoms.

5. The method according to claim 1, wherein in the general formula (1), when $R^1$ is a monovalent aliphatic hydrocarbon group, it is independently a monovalent aliphatic hydrocarbon group having 1 to 6 carbon atoms.

6. The method according to claim 1, wherein in the general formula (1), when $R^1$ is a monovalent aliphatic hydrocarbon group, it is independently selected from the group consisting of a methyl group, an ethyl group, a propyl group, a butyl group, a pentyl group, a hexyl group and an octyl group.

7. The method according to claim 1, wherein in the general formula (1), 80% or more of all the $R^1$ groups are methyl groups.

8. The method according to claim 1, wherein in the general formula (1), there is a methacrylic acid propyl group or an acrylic acid propyl group at each of the two ends of the molecule.

9. The method according to claim 1, wherein the component (B) is selected from the group consisting of isoamylacrylate, lauryl acrylate, stearyl acrylate, ethoxy-diethylene glycol acrylate, methoxy-triethylene glycol acrylate, 2-ethylhexyl-diglycol acrylate, phenoxy ethyl acrylate, phenoxydiethylene glycol acrylate, tetrahydrofurfuryl acrylate, isobornyl acrylate, and mixtures thereof.

10. The method according to claim 1, wherein the component (C) is selected from the group triethylene glycol diacrylate, polytetramethylene glycol diacrylate, neopentyl glycol diacrylate, 1,6-hexanediol diacrylate, dimethylol-tricyclodecane diacrylate, trimethylolpropane triacrylate, pentaerythritol tetraacrylate, and mixtures thereof.

11. The method according to claim 1, wherein the component (B) and the component (C) are added in a total amount of 10 to 400 parts by mass, per 100 parts by mass of the component (A).

12. The method according to claim 1, wherein the ultraviolet curable silicone composition further comprises:
(E) an organopolysiloxane being in an amount of 0.1 to 1,000 parts by mass per 100 parts by mass of the component (A), and represented by the following general formula (2)

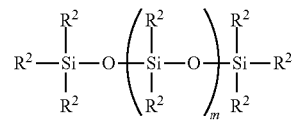

wherein each $R^2$ independently represents a group selected from a monovalent aliphatic hydrocarbon group having 1 to 10 carbon atoms, an acryloyl group, a methacryloyl group, an alkyl acrylate group and an alkyl methacrylate group, while the component (E) has per molecule one group selected from an acryloyl group, a methacryloyl group, an alkyl acrylate group and an alkyl methacrylate group; m represents a number satisfying $10 \leq m \leq 1,000$.

13. The method according to claim 1, wherein the component (E) is in an amount of 1 to 100 parts by mass, per 100 parts by mass of the component (A).

14. The method according to claim 1, wherein the ultraviolet curable silicone composition has a viscosity of not higher than 2,000 mPa·s at 23° C. and has a surface tension of not smaller than 21 mN/m.

15. The method according to claim 1, wherein the ultraviolet curable silicone composition has a viscosity of not higher than 1,000 mPa·s at 23° C.

16. The method according to claim 1, wherein the ultraviolet curable silicone composition has a surface tension of not larger than 36 mN/m.

17. The method according to claim 1, further comprising curing the ultraviolet curable silicone composition to form a cured product.

18. The method according to claim 17, wherein the curing comprises irradiating with a UVLED lamp, a high-pressure mercury lamp, a super-high pressure mercury lamp, a metal halide lamp, a carbon-arc lamp or a xenon lamp.

* * * * *